United States Patent [19]

Prosise

[11] Patent Number: 4,917,908
[45] Date of Patent: * Apr. 17, 1990

[54] REDUCED OIL FRENCH FRIED POTATO PRODUCTS AND PROCESS FOR PREPARING

[75] Inventor: William E. Prosise, Ramsey, N.J.

[73] Assignee: GAF Chemicals Corporation, Wayne, N.J.

[*] Notice: The portion of the term of this patent subsequent to Apr. 17, 1990 has been disclaimed.

[21] Appl. No.: 371,162

[22] Filed: Jun. 26, 1989

[51] Int. Cl.$^4$ .............................................. A23L 1/217
[52] U.S. Cl. .................................... 426/102; 426/302; 426/438; 426/637
[58] Field of Search ............... 426/102, 302, 637, 438, 426/441

[56] References Cited

U.S. PATENT DOCUMENTS

| | | |
|---|---|---|
| 3,424,591 | 1/1969 | Gold . |
| 3,846,572 | 11/1974 | Nonaka et al. ...................... 426/429 |
| 4,565,702 | 1/1986 | Morley et al. ........................ 426/93 |

*Primary Examiner*—Arthur L. Corbin
*Attorney, Agent, or Firm*—Walter Katz; Marilyn J. Maue; Joshua J. Ward

[57] ABSTRACT

Reduced oil French fried potato products, which have a crisp exterior and a soft interior, are provided herein. The potato products of the invention are made by coating French fry potato pieces with polyvinylpyrrolidone to provide the potato pieces with increased resistance to oil absorption during frying. The finished product has about the same moisture content as uncoated products.

17 Claims, No Drawings

4,917,908

REDUCED OIL FRENCH FRIED POTATO PRODUCTS AND PROCESS FOR PREPARING

BACKGROUND OF THE INVENTION

1. Field of the Invention

This invention relates to reduced oil French fried potato products which have a crisp exterior and a soft interior.

2. Description of the Prior Art

The moisture content of raw potato pieces for making French fries normally ranges from 75% to 85%, depending on environmental growing conditions and varieties. When such potato pieces are fried in oil at high temperature, some of this substantial amount of moisture present boils and results in the formation of capillary holes and voids. Oil from the fryer is absorbed into the holes and voids in the pieces. For this reason, regular French fried potato products have an oil content ranging from about 7% to 10%. The residual water content is above 10%, and generally, about 45 to 55%. It is desired to reduce to predetermined levels, both the oil content of the French fries, for health reasons, and the residual moisture content, in order to provide a product which has a crisp exterior and a soft interior. A decrease in oil content accompanied by the increase in the moisture content of the French fry would result in a soggy, unacceptable product.

The state of the art in this field may be ascertained by consideration of the following references.

Gold, in U.S. Pat. No. 3,424,591, describes a process for preparing French fried potato products having a reduced oil content by treating the potato pieces prior to frying with an aqueous solution of a methyl cellulose. In the Gold process, a thin coating of a thermal gel of methylcellulose and bound water is formed on the potato pieces. However, thermal gel-coated French fried potato products retain a considerable portion of the original moisture of the potato as bound water in the thermal gel. This high water content in the finished product causes thermal gel-coated French fries to exhibit a soggy texture which may be unacceptable to the consumer.

Nonaka et al., in U.S. Pat. No. 3,846,572, discloses a process for preparing fried potato products of decreased oil content by freezing the raw potato strips in dichlorodifluoromethane, leaching in water, frying in oil, and thereafter removing excess oil on the surface of the strips by immersing in oil-free dichlorodifluoromethane. However, dichlorodifluoromethane is considered harmful to the ozone layer and, for this reason, is not a readily available chemical product.

Morley, in U.S. Pat. No. 4,565,702, describes coating of insoluble dietary fibers derived from cereal bran with soluble dietary fibers of alignates, gums, pectin, mucillages and plant exudates to mask the taste and texture of the cereal bran. Other soluble dietary fibers are disclosed as useful, including biosynthetic or fermentation products such as dextran, xanthan and curdan; and chemically modified cellulose, pectin and alignate materials. Synthetic products including polyvinylpyrrolidone, carboxyvinyl polymers and polyethylene oxide polymers were mentioned as suitable soluble fibers for the purpose intended. However, there was no suggestion that any soluble dietery fiber could be used for making deep fried potato products, or particularly, for reducing oil absorption into French fried potato products and for reducing the moisture content of the potato to acceptable levels.

Accordingly, an object of this invention is to provide a reduced oil French fried potato product which has a crisp exterior and a soft interior.

Another object of the invention is to provide an economical process for making such reduced oil French fry potato products.

These and other objects and features of the invention will be made apparent from the following description of the invention.

SUMMARY OF THE INVENTION

In accordance with the invention, reduced oil French fry potato products which have a crisp exterior and a soft interior are provided herein.

The French fry potato products of the invention are made by coating suitable French fry potato pieces with polyvinylpyrrolidone to provide the potato pieces with increased resistance to oil absorption during frying. The finished French fry potato products herein display the desirable organoleptic properties of crispness on the exterior and a soft interior.

Oil reductions of 20% or more are achieved using polyvinylpyrrolidone coatings in the range of about 0.1–5% by weight, preferably about 0.5–1.55%, of the finished potato product, while achieving the same water content of regular, uncoated French fry potatoes.

DETAILED DESCRIPTION OF THE INVENTION

In accordance with the invention, peeled raw potatoes are cut into potato pieces having a thickness of about 10 mm.×10 mm.×60 mm., which is suitable for making French fry potato products. The potato pieces then are provided with a coating of polyvinylpyrrolidone. Suitably, this coating may be provided by dipping the pieces into an aqueous polyvinylpyrrolidone solution, or by spraying the solution onto the pieces. The applied coating is then dried, e.g. in air, to form a substantially continuous, dry coating of uniform consistency. Generally, an aqueous polyvinylpyrrolidone solution having a concentration of 1–50% by weight polyvinylpyrrolidone is used. High solution concentrations are preferred because thicker coatings can be formed more rapidly. The polyvinyl-pyrrolidone coatings usually comprise about 0.1–6% by weight of the dry, coated pieces.

Suitable PVP polymers utilizable herein are those having a purity sufficient for use as a food additive. The molecular weight of the PVP used is generally in the range of about $M_w = 1 \times 10^3$ to $2 \times 10^6$ (K-12 to K-120), and, preferably, K-12 to K-90 are used.

While raw potato pieces may be used for application of the PVP coating, precooked, reformed or partially fried potato pieces also may be used.

The PVP-coated potato pieces then are deep fried in oil in the usual manner to form the finished French fry potato food product. The frying step reduces the moisture content of the potato to about 45–48% by wt. or less. At the same time, some oil is introduced, generally to the 4–5% level. Therefore, the PVP content in the finished potato chip is higher than on the potato pieces, but still within the range of about 0.1–6% by weight, preferably 0.5–3%.

The PVP-coated French fry potatoes of the invention show an oil reduction of 20% or more, and lose about the same amount of moisture, when compared to French fry potatoes made without PVP. Generally the total oil content of PVP-coated French fry potatoes is about 4% by weight of the chip, compared to about 6% or more in uncoated potato products prepared side by side.

The PVP-coated potato products of the invention also have excellent organoleptic properties. Specifically, the fries herein have a crisp exterior texture, and a soft interior. The color is golden brown, and they have a flavor which is typical of a potato-like, clean fried taste.

The invention will now be illustrated by the following working examples.

EXAMPLE 1

Idaho potatoes were peeled, cut into slices of 10 mm.×10 mm.×60 mm., washed with water, and divided into two 200 g. batches. One batch was dipped into a 5% w/w solution of PVP (K-90) (GAF Corp.) for ten minutes. The other batch was immersed in water. The treated potato pieces in both batches then were air dried, and separately deep fried in 1500 g. of edible frying oil at 375° F. for 12 minutes. The fried pieces then were lifted out of frying oil and drained of non-absorbed surface oil for 1 minute over the fryer. After cooling, the potato products were analyzed and evaluated. The results are shown below.

TABLE 1

| | Chemical Analysis | | | |
| --- | --- | --- | --- | --- |
| | % by wt. PVP | % by wt. $H_2O$ | % by wt. Oil | % Oil Reduction |
| PVP-Coated French Fry Potatoes (A) | 0.7 | 46.0 | 4.9 | 28 |
| Uncoated French Fry Potatoes (B) | — | 48.2 | 6.7 | |

TABLE 2

| | Organoleptic Properties | | |
| --- | --- | --- | --- |
| | Color | Flavor | Texture |
| A | golden brown | clean fried potato | crispy exterior, soft interior |
| B | golden brown | clean fried potato | crispy exterior, soft interior |

EXAMPLE 2

The procedure of Example 1 was followed using a 15% solution of PVP (K-30). A 21% oil reduction (from 8.6 to 6.8%) was obtained with 1.5% PVP present, at a moisture level of 43% water vs. 43.5% for uncoated potatoes. The organoleptic properties were similar to uncoated products.

Although the invention has been described with reference to certain embodiments thereof, it will be understood that changes and modifications may be made which are within the skill of the art. Accordingly, it is intended to be bound by the appended claims only, in which:

What is claimed is:

1. A reduced oil French fried potato product comprising French fry potato pieces which are coated with polyvinylpyrrolidone (PVP).

2. A reduced oil French fried potato product according to claim 1 wherein the French fry potato pieces are raw, precooked or partially fried.

3. A reduced oil French fried potato product according to claim 1 wherein said polyvinylpyrrolidone coating constitutes about 0.1-6% by weight of said product.

4. A reduced oil French fry potato product according to claim 3 having from 0.5-3% PVP.

5. A reduced oil French fried potato product according to claim 1 wherein the polyvinylpyrrolidone has a molecular weight of K-12 to K-120.

6. A reduced oil French fried potato product according to claim 1 wherein the moisture content is above 10% by weight of the product.

7. A reduced oil French fried potato product according to claim 6 wherein the moisture level is about the same as in French fries prepared using uncoated potato pieces.

8. A reduced oil French fried potato product according to claim 7 wherein the product has a crisp exterior, and a soft interior.

9. A product comprising a partially fried French fry potato piece which is coated with polyvinylpyrrolidone.

10. A product comprising a raw French fry potato piece which is coated with polyvinylpyrrolidone.

11. In a process of making French fried potatoes, the improvement which comprises coating raw, precooked or partially fried French fry potato pieces with polyvinylpyrrolidone prior to final frying, to provide a product having a reduced oil content substantially without affecting its moisture content.

12. A process according to claim 11 wherein the pieces are raw.

13. A process according to claim 11 wherein the pieces are precooked.

14. A process according to claim 11 wherein the pieces are partially fried.

15. A process according to claim 11 wherein the French fry pieces are contacted with an aqueous solution having a concentration of 1-50% by weight PVP.

16. A process according to claim 11 wherein the PVP coating constitutes about 0.1-6% by wt. of the coated piece.

17. A process according to claim 11 wherein the potato pieces are partially fried after coating.

* * * * *